J. F. MARTIN.
APPARATUS FOR MEASURING LIGHT.
APPLICATION FILED MAR. 14, 1910.
1,000,831.
Patented Aug. 15, 1911.
4 SHEETS—SHEET 1.
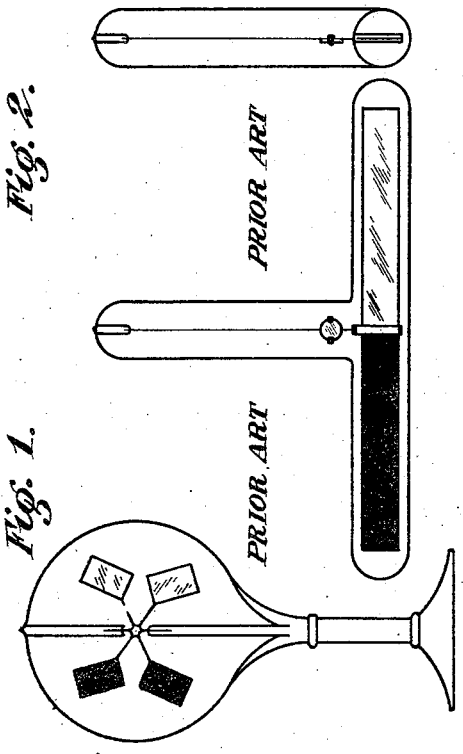
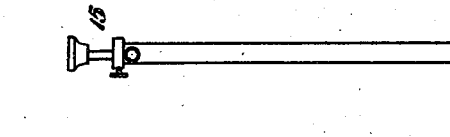
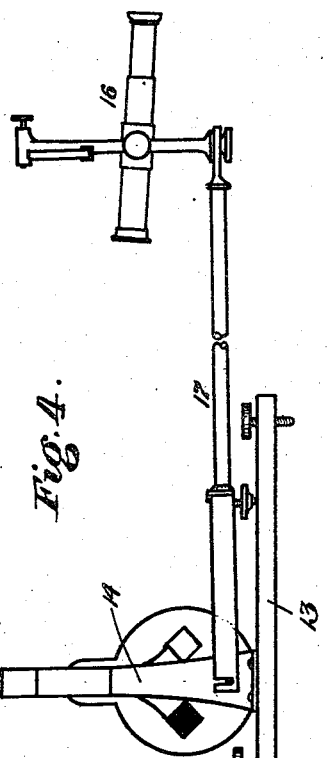
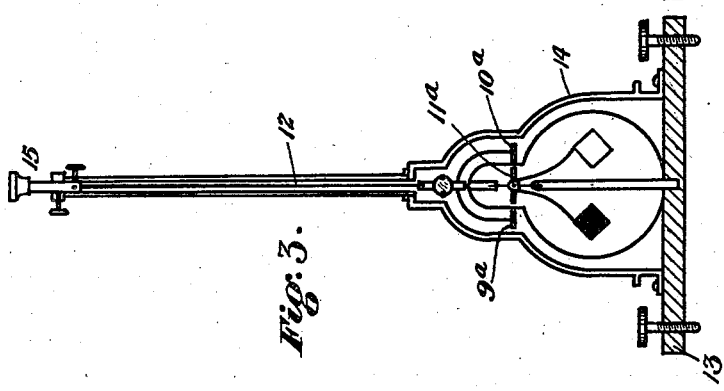

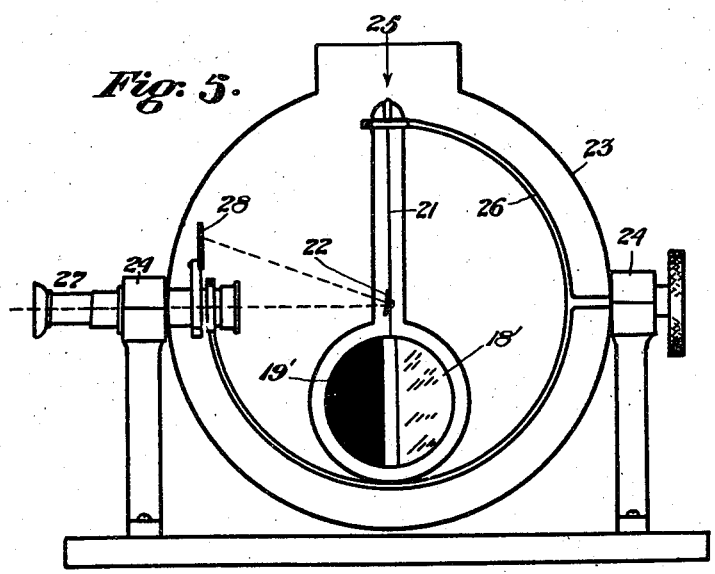

J. F. MARTIN.
APPARATUS FOR MEASURING LIGHT.
APPLICATION FILED MAR. 14, 1910.
1,000,831.
Patented Aug. 15, 1911.
4 SHEETS—SHEET 3.
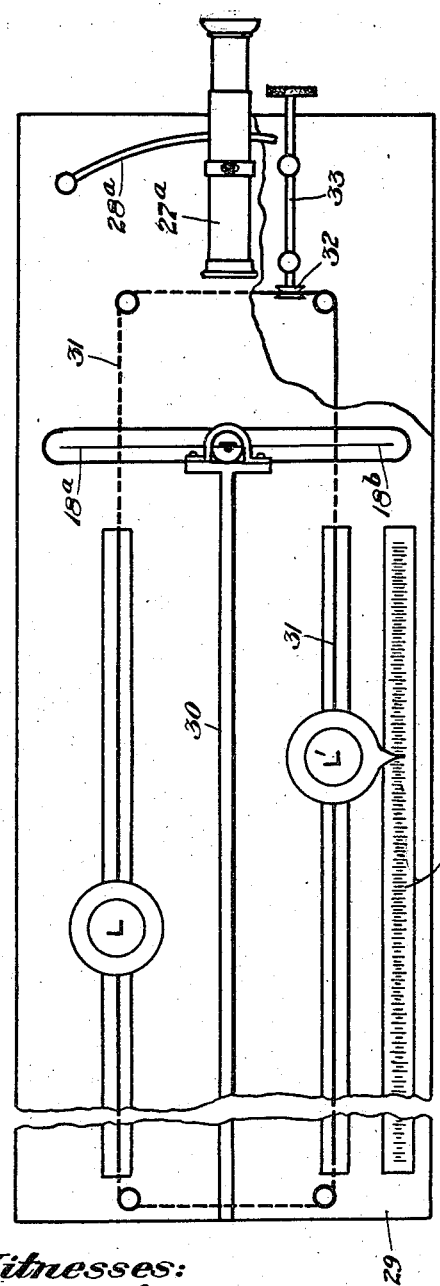
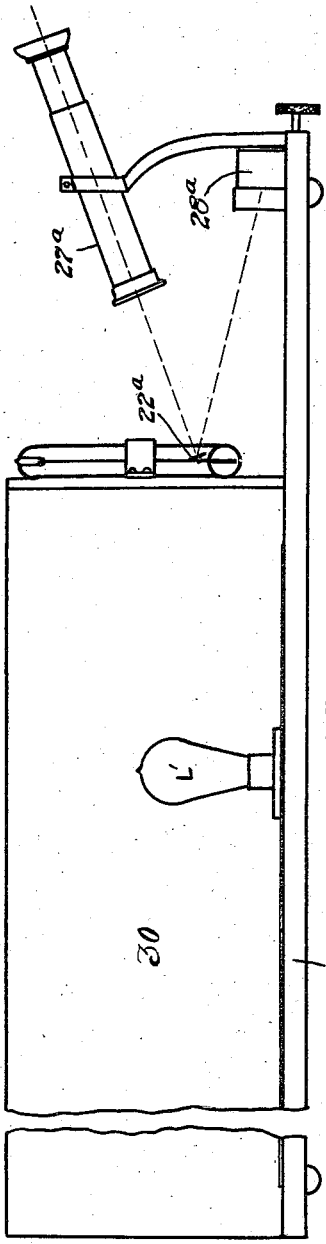

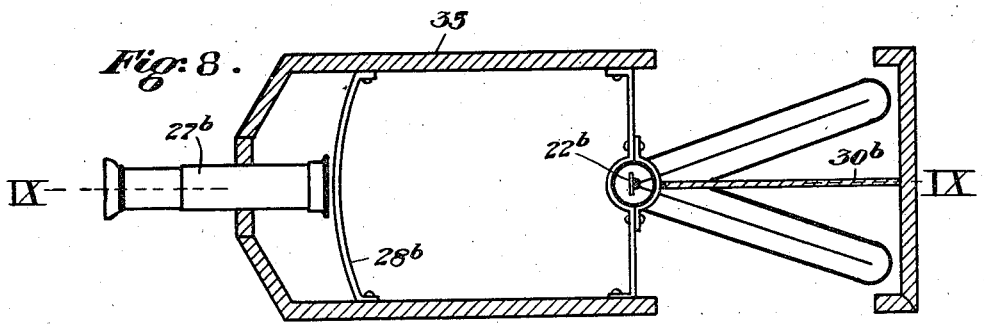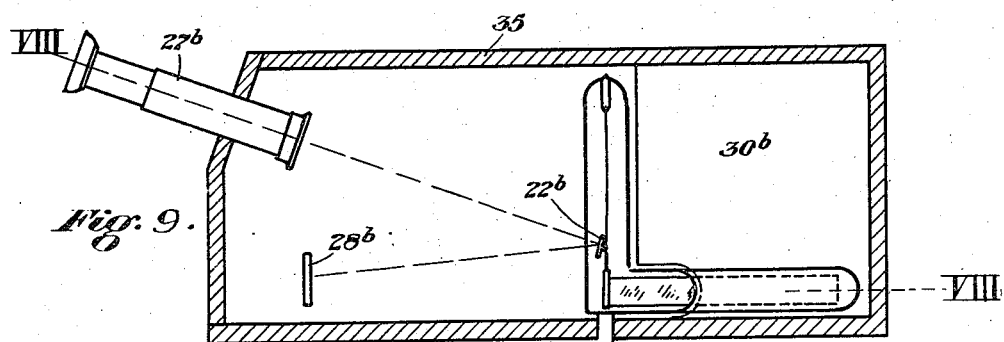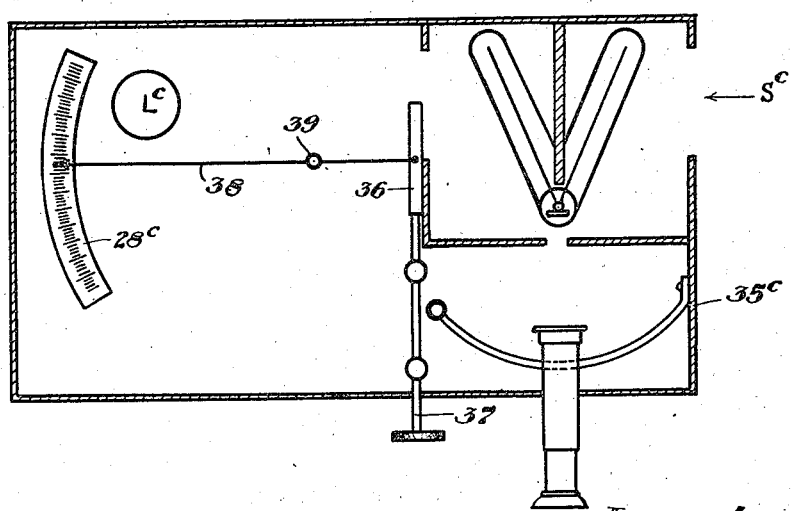

UNITED STATES PATENT OFFICE.

JAMES FRANK MARTIN, OF PITTSBURG, PENNSYLVANIA.

APPARATUS FOR MEASURING LIGHT.

1,000,831.  Specification of Letters Patent.  Patented Aug. 15, 1911.

Application filed March 14, 1910. Serial No. 549,252.

*To all whom it may concern:*

Be it known that I, JAMES FRANK MARTIN, a citizen of the United States, residing at Pittsburg, in the county of Allegheny and State of Pennsylvania, have invented certain new and useful Improvements in Apparatus for Measuring Light, of which the following is a specification, reference being had therein to the accompanying drawing.

My invention relates to improvements in apparatus for measuring light.

The invention utilizes the well known radiometer by combining with it external apparatus and by adapting certain forms of construction of radiometer to secure definite relative results depending on the relation of the radiometer to the source of radiation to be measured, the means for transmitting the value of the torque of the vanes externally of the radiometer bulb, comparing the torque value to the standard of measurement, utilizing electrical resistance and resulting heat to deflect the vanes, providing the flies with specially arranged radiating surfaces and subjecting one of them to the source of radiation and the other to the source of a standard light, and to other phenomena and features of construction and operation as shall be more fully hereinafter described and particularly claimed.

Any ordinary adaptation of the instrument for purposes of measuring light is not only limited in application, but incapable to use in a commercial way in the common well known form of the instrument, which has no practical application except as an advertising symbol for opticians and for demonstrating the action of light and heat in an elementary way.

As a general statement, it may be said that the phenomenon of torque in the instrument can be readily explained through the molecular theory of gases and the action is at once an illustration and a proof of the modern laws applied to gaseous bodies. Taking a given instrument which is connected to a suitable vacuum creating apparatus and which is subject to the influence of a constant light source, it is found that on gradually exhausting the bulb, the vane will begin moving slowly in a direction such that the black side of the flies will move toward the light by absorption. Increasing the vacuum accelerates the rotation up to a certain point at which it gradually diminishes until a point is reached where all action ceases. On carrying the vacuum past this point torque again develops but it is in the opposite direction, gradually increasing until the exhaustion has reached a value equal to 35 millionths of an atmosphere. Here the torque of one milligram per square centimeter area of the black surface on the flies is in effect, and if exhaustion is carried higher the torque diminishes. This is the critical point at which the amplitude of vibration of the individual molecules of the small residue of gas in the bulb is greatest and which bears a very distinct proportion to the mean distance of the surface of the flies from the inner surface of the glass envelop, and also to the molecular weight of the gas residue. From this it follows that the torque obtained can be increased to a maximum by making the relative difference between the surface area of the flies and the area of the inner surface of the globe as small as practicable, but that changing the nature of the gas residue changes only the relation of the critical point and the degree of vacuum. In practice it is found that pure hydrogen gas is the most satisfactory. Although the energy manifest in the torque of the instrument is not the direct effect of radiant energy, it affords a means of very accurately determining the intensity of radiation from a single source or a comparison between two sources of different intensity.

In carrying out my improved method, which is not necessarily limited to any of the particular arrangements or constructions which I have illustrated, it will be understood that such forms are shown to illustrate a variety of exemplifications of the method as well as the modifications in construction and detail which may be made to adapt the invention to particular conditions.

In the drawings:—Figure 1 illustrates in elevation, an ordinary well known four fly radiometer in which the flies are of platinum foil, one side of each of which is coated with lamp-black, and which are mounted on a spider and delicately poised on a needle within a globe which is exhausted to approximately thirty-five millionths of an atmosphere. Fig. 2 illustrates a well known form which, with that of Fig. 1, was described and suggested by Sir William Crookes for the purpose of use as a photometer, showing a two vaned radiometer in which the flies were attached to a small magnetic needle, and this so checked by an external magnet that the strongest light would be incapable of causing the needle to make a half revolution. If the circumference of the globe be graduated, and the apparatus be brought within the influence of a source of light, the angle to which the needle is deflected will be a direct measurement of the intensity of the light, and further, by a simple arrangement such an instrument might be made self-recording. Figs. 3 and 4 show in end and side elevation respectively, a construction employing a similar form of radiometer wherein the torque of the instrument is transmitted to the exterior of the bulb where it is balanced against the torsional stress of a silver wire suspension and fitted with a reading telescope and scale. Fig. 5 shows a form of instrument having a fly suspended directly from the supporting member, having a small reflecting mirror and inclosed within a silvered glass globe adjustably mounted in bearings, the ratio of surface between the area of the fly and that of the inclosing globe being at a maximum. Figs. 6 and 7 are views in plan and side elevation respectively of constructions similar in principle to that of Fig. 5, having oppositely disposed vanes, one of which is subject to the source of light being tested and the other to a standard source of light, with means for adjusting each relatively to the other, and having a measuring scale. Fig. 8 is a horizontal sectional view taken on the line VIII VIII of Fig. 9 showing an adaptation of the invention to use as a "spot-box" on an ordinary bar photometer. Fig. 9 is a longitudinal sectional view of the same instrument indicated by the line IX IX of Fig. 8. Fig. 10 is a sectional plan view of the same construction for portable work having an adjustable slide and reading scale.

The constructions shown in Figs. 1 and 2 are well known.

When the fact that modern sources of illumination show a wide variation in the ratio of the energy radiation within and without, the visible spectrum is weighed against the physical imperfectness of the eye, and the advantages of using the radiometer are apparent.

It has been found that the only photometers which may be relied upon to give reliable values are those in which a comparison light source is used, and reliance is placed upon the ability of the eye to judge equality of illumination. That is, the relative physiological effect of different wave lengths varies, not only with the wave lengths, but also with the absolute intensity of illumination, and while throughout the whole the range of sensitiveness of the eye for one color of light is greater than for another, the difference is far greater for low than for high values of illumination. The radiometer removes all such source of error by giving an indirect but accurate comparison with a constant and easily determined physical effect.

The use of magnetic attraction as a means for transmitting the torque from the interior to the exterior of the bulb, the torque of the radiometer vanes being balanced against the torsional stress of a silver wire suspension, is illustrated in Figs. 3 and 4 in which $9^a$ and $10^a$ are separate permanent magnets acting on a soft iron rod $11^a$ fixed to the vane bearing, and being suspended by the silver wire 12 and balanced against the torsional stress thereof. The mounting of the apparatus upon a suitable base 13 with the upwardly extending frame 14 and the terminal adjusting screws 15 are features of design or construction within the skill of any operator familiar with the art, it being understood that the upper end of wire 12 is fixed against rotation. Fig. 4 shows the adaptation to such an arrangement of a reading telescope and scale 16 mounted on an outwardly extended support 17.

The most practical form of the instrument is shown in Fig. 5. The radiometer proper consists of semi-circular vanes 18', 19', mounted directly on the suspension 21 within the bulb, the suspension 21 being provided with a small reflecting mirror 22. Inclosing the entire structure is a silvered glass globe 23 which is revoluble about bearings 24, 24, and is provided with a light opening 25. The bulb and its stem are supported by means of a frame 26 in the same bearings, while the telescope 27 is mounted in one of them as shown, and provided with a reading scale 28. In operating this form of instrument, the outer globe 23 is revolved until the opening 25 is directly in line with the source of radiation to be measured and with the radiometer bulb, when the deflection can be read on the scale 28 through the telescope 27 and mirror 22.

In Figs. 6 and 7 one form of the apparatus is shown adapted to a modified construction of the bar photometer. Two sources of light, L the source being tested and L' the standard source, are mounted on a supporting base 29 with an intervening barrier 30 and with such relation to the position of the radiometer that the radiation from each affects independently the halves of the vane $18^a$ and $18^b$ respectively. Each of the light sources, which may be lamps, is attached to an endless belt or cord 31 passing around suitable sheaves and an adjusting sheave 32 on a stem 33 whereby rotation thereof will shift the lights toward and from the radiometer vanes respectively. In operation, the light sources L and L' are adjusted until there is no deflection of the radiometer as observed through the reading telescope $27^a$ on the scale $28^a$. 34 is a registering scale, and when the position of the standard L' has been determined, its reference to the scale 34 determines the value of the source of light L. This instrument can be constructed with a sensitiveness so high that a difference of .018 of a foot candle power is plainly indicated.

In Figs. 8 and 9 the radiometer in the form of a bent tube in which the blank surfaces of the flies are inverted whereby their torque is opposed, is mounted within a "spot box" 35 provided with a reading telescope 27$^b$, reflecting mirror 22$^b$ and a scale 28$^b$, the radiometer bulbs being separated by a barrier 30$^b$. The permanent magnet is shown at 3$^h$. The action in this construction is practically the same as that before described and the instrument is capable of attaining the same high degree of sensitiveness. In Fig. 10 the same general construction is illustrated, the apparatus being mounted within a "spot box" 35$^c$, the end wall of which has an opening for radiation from any source of light to be measured S$^c$, opposed to radiation from a standard source, as an electric lamp L$^c$. 36 is an adjustable slide for increasing or diminishing the opening between the standard light and the opposed radiometer vane provided with any suitable adjusting mechanism as a rod 37. 28$^c$ is a reading scale and 38 is a pointer pivoted at 39, secured at one end to the slide 36 and having an indicating terminal movable with relation to scale 28$^c$. The radiometer being brought to a balance by adjusting the position of the slide 36, the comparative value of the two sources of light L$^c$ and S$^c$ is then indicated by the position of the pointer 38 on scale 28$^c$.

What I claim is:—

1. Means for measuring light consisting of the combination with a radiometer subject to the source of light to be measured, of means for transmitting the torque value of the vanes to the exterior of the radiometer, and means for comparing the same with a standard of measurement.

2. Means for measuring light consisting of the combination with a radiometer subject to the source of light to be measured, of means for transmitting the torque value of the vanes to the exterior of the radiometer, means for comparing the same with a standard of measurement, and means providing for indicating the results of such comparison.

3. Means for measuring light consisting of the combination with a radiometer subject to the source of light to be measured, of means for transmitting the torque value of the vanes to the exterior of the radiometer, means for comparing the same with a standard of measurement, and means for adjusting the exposure to the standard of measurement.

4. Means for measuring light consisting of the combination with a radiometer subject to the source of light to be measured, of means for transmitting the torque value of the vanes to the exterior of the radiometer, means for comparing the same with a standard of measurement, means for adjusting the exposure to the standard of measurement, and means providing for indicating the results of such comparison.

5. The combination of a radiometer provided with a reflecting mirror mounted to move with the radiometer vane, of a telescope and scale.

In testimony whereof I affix my signature in presence of two witnesses.

J. FRANK MARTIN.

Witnesses:
C. M. CLARKE,
CHAS. S. LEPLEY.